United States Patent
Longman et al.

(10) Patent No.: US 11,313,948 B2
(45) Date of Patent: Apr. 26, 2022

(54) RADAR SYSTEM AND METHOD FOR IDENTIFYING MULTIPLE TARGETS IN A BEAM RESPONSE SPECTRUM

(71) Applicant: GM GLOBAL TECHNOLOGY OPERATIONS LLC, Detroit, MI (US)

(72) Inventors: Oren Longman, Tel Aviv (IL); Igal Bilik, Rehovot (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 16/505,107

(22) Filed: Jul. 8, 2019

(65) Prior Publication Data

US 2021/0011123 A1    Jan. 14, 2021

(51) Int. Cl.
| | | |
|---|---|---|
| *G01S 7/41* | (2006.01) | |
| *G01S 7/40* | (2006.01) | |
| *G01S 13/42* | (2006.01) | |
| G01S 13/931 | (2020.01) | |

(52) U.S. Cl.
CPC .............. *G01S 7/411* (2013.01); *G01S 7/40* (2013.01); *G01S 13/42* (2013.01); *G01S 13/931* (2013.01)

(58) Field of Classification Search
CPC ............ G01S 7/411; G01S 7/40; G01S 13/42
See application file for complete search history.

(56) References Cited

U.S. PATENT DOCUMENTS

| | | | | |
|---|---|---|---|---|
| 5,936,575 A | * | 8/1999 | Azzarelli | H01Q 21/24 342/362 |
| 6,801,156 B1 | * | 10/2004 | Wasiewicz | G01S 13/44 342/95 |
| 7,330,149 B2 | * | 2/2008 | Weatherford | G01S 13/44 342/141 |
| 7,667,638 B1 | * | 2/2010 | Karam | G01S 7/295 342/149 |
| 10,365,364 B1 | * | 7/2019 | Prados | G01S 13/931 |
| 2005/0285775 A1 | * | 12/2005 | Kishida | G01S 7/41 342/70 |
| 2013/0307729 A1 | * | 11/2013 | Stensland | G01S 3/14 342/386 |
| 2017/0234986 A1 | * | 8/2017 | Ekstrom | G01S 19/215 342/357.59 |
| 2019/0056506 A1 | * | 2/2019 | Bialer | G01S 7/4004 |
| 2019/0339374 A1 | * | 11/2019 | Kageme | G01S 13/449 |
| 2020/0011968 A1 | * | 1/2020 | Hammes | G01S 13/42 |
| 2021/0132176 A1 | * | 5/2021 | Dingli | G01S 3/8083 |

* cited by examiner

*Primary Examiner* — Marcus E Windrich
(74) *Attorney, Agent, or Firm* — Cantor Colburn LLP

(57) ABSTRACT

A radar system may include a transmitter, a receiver, and a controller. The controller may calculate a received beam response spectrum based on the received reflected radar signal, detect a first maximum value of the received beam response spectrum, identify an angle corresponding to the first maximum value as a first target angle, obtain a threshold envelope based on the first maximum value and the first target angle, detect a second maximum value in a portion of the received beam response spectrum being greater than the threshold envelope, identify an angle corresponding to the second maximum value as a second target angle, and output the first target angle as the angle of arrival of the reflected radar signal from the first target and the second target angle as the angle of arrival of the reflected radar signal from the second target.

18 Claims, 12 Drawing Sheets

RADAR SYSTEM AND METHOD FOR IDENTIFYING MULTIPLE TARGETS IN A BEAM RESPONSE SPECTRUM

INTRODUCTION

The subject disclosure relates to a radar system and method identifying multiple targets in a beam response spectrum.

In radar systems, angle of arrival of reflections from a detection target may be identified by analyzing a detected beam response spectrum derived from reflected radar signals. A detection target may be identified in the detected beam response spectrum by identifying a maximum value of the detected beam response spectrum. A constant false-alarm rate (CFAR) threshold may be applied to the beam response so as to exclude noise and detect additional targets. For example, a CFAR threshold may be set high enough to exclude noise as being mistaken for a target response but low enough such that weaker reflections from targets are also detected. However, applying an angle-invariant threshold such as a CFAR threshold may result in the false identification of side lobes of a beam response as a valid target, or may exclude secondary detected targets if the power of the beam response for the secondary detected targets is below the CFAR threshold.

Accordingly, it may be desirable to provide a radar system and method for identifying multiple targets in a beam response spectrum that uses a threshold envelope that varies as a function of angle of arrival.

SUMMARY

In one exemplary embodiment, a radar system may include a transmitter structured to transmit a radar signal, a receiver structured to receive a reflected radar signal, and a controller. The controller may be configured to identify an angle of arrival of a reflected radar signal from a first target and an angle of arrival of a reflected radar signal from a second target. The controller may be further configured to calculate a received beam response spectrum based on the received reflected radar signal, the received beam response spectrum comprising a set of power values as a function of angle of arrival. The controller may be configured to detect a first maximum value of the received beam response spectrum. The controller may be configured to identify an angle corresponding to the first maximum value as a first target angle. The controller may be configured to obtain a threshold envelope based on the first maximum value and the first target angle. The controller may be configured to detect a second maximum value in a portion of the received beam response spectrum being greater than the threshold envelope. The controller may be configured to identify an angle corresponding to the second maximum value as a second target angle. The controller may be configured to output the first target angle as the angle of arrival of the reflected radar signal from the first target and the second target angle as the angle of arrival of the reflected radar signal from the second target.

In another exemplary embodiment of the radar system, the received beam response spectrum may include a target main lobe including the first maximum value. The threshold envelope may be a function having a value equal to the first maximum value for angles corresponding to a width of the target main lobe, and, for all other angles, having a value equal to a highest sidelobe peak level among sidelobes immediately adjacent to the target main lobe in the received beam response spectrum.

In another exemplary embodiment of the radar system, the radar system may include a storage device storing a plurality of stored threshold envelopes, each stored threshold envelope of the plurality of stored threshold envelopes being associated with a different angle of arrival. The controller may be configured such that the obtaining a threshold envelope based on the first maximum value and the first target angle includes identifying a first stored threshold envelope among the plurality of stored threshold envelopes having an associated angle of arrival corresponding to the first target angle, and setting the first stored threshold envelope as the threshold envelope.

In another exemplary embodiment of the radar system, the controller may be further configured to generate a cumulative threshold envelope initially equal to the threshold envelope. The controller may be further configured to recursively perform obtaining an additional threshold envelope based on an additional maximum value and an additional target angle, modifying the cumulative threshold envelope based on the additional threshold envelope, and detecting a subsequent maximum value in a portion of the received beam response spectrum being greater than the cumulative threshold envelope until no subsequent maximum values are detected. The second maximum value may be used as an initial value of the additional maximum value. The second target angle may be used as an initial value of the additional target area.

In another exemplary embodiment of the radar system, the threshold envelope may be calculated based on an arbitrary beam response of the radar system at the first target angle and may be a function that, for all angles, has a value greater than a value of the arbitrary beam response.

In another exemplary embodiment of the radar system, the threshold envelope is calculated based on an arbitrary beam response of the radar system at the first target angle and may be calculated by performing smoothing with a Gaussian window over the arbitrary beam response and adding a bias value.

In another exemplary embodiment of the radar system, the threshold envelope is calculated based on an arbitrary beam response of the radar system at the first target angle. The arbitrary beam response may include a plurality of lobes, each lobe comprising a maximum value and a width. The threshold envelope may be a function such that, for each lobe of the arbitrary beam response, the threshold envelope has a value equal to the maximum value of the lobe plus a bias value for all angles corresponding to the width of the lobe.

In another exemplary embodiment of the radar system, the threshold envelope may monotonically increase for angles less than the first target angle and monotonically decrease for angles greater than the first target angle.

In another exemplary embodiment of the radar system, the radar system may include a storage device storing a plurality of stored threshold envelopes. Each stored threshold envelope of the plurality of stored threshold envelopes may be associated with a different angle of arrival. The plurality of stored threshold envelopes may be based on a confusion matrix given by the following equation:

$$\text{ConfusionMat} = \text{CalibrationMat} \cdot \text{CalibrationMat}^H$$

where ConfusionMat is the confusion matrix, CalibrationMat is a calibration matrix of the radar system, and CalibrationMat$^H$ is a Hermitian transpose of the calibration matrix. The plurality of stored threshold envelopes may include, for each angle of arrival θ, a stored threshold envelope calculated by generating an arbitrary beam response $B_{74}$ given by the equation $B_\theta = |A_\theta|^2$, where $A_\theta$=ConfusionMat[θ,:]. The stored threshold envelope may be further calculated by generating an array E equal to the arbitrary beam response $B_\theta$. The stored threshold envelope may be further calculated by identifying an index M of a maximum value of the arbitrary beam response $B_\theta$. The stored threshold envelope may be further calculated by, for each element of array E from $E_1$ to $E_{M-1}$, setting $E_{i+1}$ equal to $E_i$ if $E_{i+1}$ is less than $E_i$, i being an index of array E. The stored threshold envelope may be further calculated by, for each element of array E from $E_I$ to $E_{M+1}$, I being a length of array E, setting $E_i$ equal to $E_{i+1}$ if $E_{i+1}$ is greater than $E_i$. The stored threshold envelope may be further calculated by, for each element of array E from $E_N$ to $E_{M-1}$, N being a distance between nulls in the arbitrary beam response $B_\theta$, setting elements of array E from $E_{i-N+1}$ to $E_i$ equal to $E_{i+1}$ if $E_{i+1}$ is equal to $E_i$. The stored threshold envelope may be further calculated by, for each element of array E from $E_{I-N}$ to $E_{M+1}$, setting elements of array E from $E_{i+N}$ to $E_i$ equal to $E_{i+1}$ if $E_{i+1}$ is equal to $E_i$. The stored threshold envelope may be further calculated setting element of array E from $E_{M-2N}$ to $E_{M+2N}$ equal to $E_M$. The stored threshold envelope may be further calculated by adding a bias value to each element of array E. The stored threshold envelope may be further calculated by setting array E as the stored threshold envelope for angle θ. The controller may be configured such that obtaining a threshold envelope based on the first maximum value and the first target angle includes identifying a first stored threshold envelope among the plurality of stored threshold envelopes having an associated angle of arrival corresponding to the first target angle, and setting the first stored threshold envelope as the threshold envelope.

In one exemplary embodiment, a method for identifying targets in a beam response of a radar system may include receiving a reflected radar signal with a radar receiver. The method may further include calculating a received beam response spectrum based on the received reflected radar signal, the received beam response spectrum comprising a set of power values as a function of angle of arrival. The method may further include detecting a first maximum value of the received beam response spectrum. The method may further include identifying an angle corresponding to the first maximum value as a first target angle. The method may further include obtaining a threshold envelope based on the first maximum value and the first target angle. The method may further include detecting a second maximum value in a portion of the received beam response spectrum being greater than the threshold envelope. The method may further include identifying an angle corresponding to the second maximum value as a second target angle. The method may further include outputting the first target angle as an angle of arrival of the reflected radar signal from a first target and the second target angle as an angle of arrival of the reflected radar signal from a second target.

In another exemplary embodiment of the method, the received beam response spectrum may include a target main lobe including the first maximum value. The threshold envelope may be a function having a value equal to the first maximum value for angles corresponding to a width of the target main lobe, and, for all other angles, having a value equal to a highest sidelobe peak level among sidelobes immediately adjacent to the target main lobe in the received beam response spectrum.

In another exemplary embodiment, the method may include previously storing a plurality of stored threshold envelopes. Each stored threshold envelope of the plurality of stored threshold envelopes may be associated with a different angle of arrival. The obtaining a threshold envelope based on the first maximum value and the first target angle may include identifying a first stored threshold envelope among the plurality of stored threshold envelopes having an associated angle of arrival corresponding to the first target angle. The obtaining a threshold envelope based on the first maximum value and the first target angle may further include setting the first stored threshold envelope as the threshold envelope.

In another exemplary embodiment of the method, the method may further include generating a cumulative threshold envelope initially equal to the threshold envelope. The method may further include recursively performing obtaining an additional threshold envelope based on an additional maximum value and an additional target angle, modifying the cumulative threshold envelope based on the additional threshold envelope, and detecting a subsequent maximum value in a portion of the received beam response spectrum being greater than the cumulative threshold envelope until no subsequent maximum values are detected. The second maximum value may be used as an initial value of the additional maximum value and the second target angle may be used as an initial value of the additional target area.

In another exemplary embodiment of the method, the threshold envelope may be calculated based on an arbitrary beam response of the radar system at the first target angle and may be a function that, for all angles, has a value greater than a value of the arbitrary beam response.

In another exemplary embodiment of the method, the threshold envelope may be calculated based on an arbitrary beam response of the radar system at the first target angle and may be calculated by performing smoothing with a Gaussian window over the arbitrary beam response and adding a bias value.

In another exemplary embodiment of the method, the threshold envelope is calculated based on an arbitrary beam response of the radar system at the first target angle. The arbitrary beam response may include a plurality of lobes, each lobe comprising a maximum value and a width. The threshold envelope may be a function such that, for each lobe of the arbitrary beam response, the threshold envelope has a value equal to the maximum value of the lobe plus a bias value for all angles corresponding to the width of the lobe.

In another exemplary embodiment of the method, the threshold envelope may monotonically increase for angles less than the first target angle and monotonically decrease for angles greater than the first target angle.

In another exemplary embodiment, the method may further include calibrating the radar system to generate a calibration matrix. The method may further include calculating a confusion matrix based on the calibration matrix according to the following equation:

$$\text{ConfusionMat} = \text{CalibrationMat} \cdot \text{CalibrationMat}^H;$$

wherein ConfusionMat is the confusion matrix, CalibrationMat is the calibration matrix, and CalibrationMat$^H$ is a Hermitian transpose of the calibration matrix. The method may further include calculating a plurality of stored threshold envelopes based on the confusion matrix, each stored threshold envelope of the plurality of stored threshold envelopes being associated with a different angle of arrival. The calculating a plurality of stored threshold envelopes comprises, for each angle of arrival θ, calculating a stored threshold envelope. The calculating the stored threshold envelope may include generating an arbitrary beam response $B_\theta$ given by the equation $B_\theta=|A_\theta|^2$, where $A_\theta$=ConfusionMat[θ,:]. The calculating the stored threshold envelope may further include generating an array E equal to the arbitrary beam response $B_{74}$. The calculating the stored threshold envelope may further include identifying an index M of a maximum value of the arbitrary beam response $B_\theta$. The calculating the stored threshold envelope may further include, for each element of array E from $E_1$ to $E_{M-1}$, setting $E_{i+1}$ equal to $E_i$ if $E_{i+1}$ is less than $E_i$, i being an index of array E. The calculating the stored threshold envelope may further include, for each element of array E from $E_I$ to $E_{M+1}$, I being a length of array E, setting $E_i$ equal to $E_{i+1}$ if $E_{i+1}$ is greater than $E_i$. The calculating the stored threshold envelope may further include, for each element of array E from $E_N$ to $E_{M-1}$, N being a distance between nulls in the arbitrary beam response $B_\theta$, setting elements of array E from $E_{i-N+1}$ to $E_i$ equal to $E_{i+1}$ if $E_{i+1}$ is equal to $E_i$. The calculating the stored threshold envelope may further include, for each element of array E from $E_{I-N}$ to $E_{M+1}$, setting elements of array E from $E_{i+N}$ to $E_i$ equal to $E_{i+1}$ if $E_{i+1}$ is equal to $E_i$. The calculating the stored threshold envelope may further include setting element of array E from $E_{M+2N}$ to $E_{M+2N}$ equal to $E_M$. The calculating the stored threshold envelope may further include adding a bias value to each element of array E. The calculating the stored threshold envelope may further include setting the stored threshold envelope to array E. The obtaining a threshold envelope based on the first maximum value and the first target angle may include identifying a first stored threshold envelope among the plurality of stored threshold envelopes having an associated angle of arrival corresponding to the first target angle. The obtaining a threshold envelope based on the first maximum value and the first target angle may further include setting the first stored threshold envelope as the threshold envelope.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
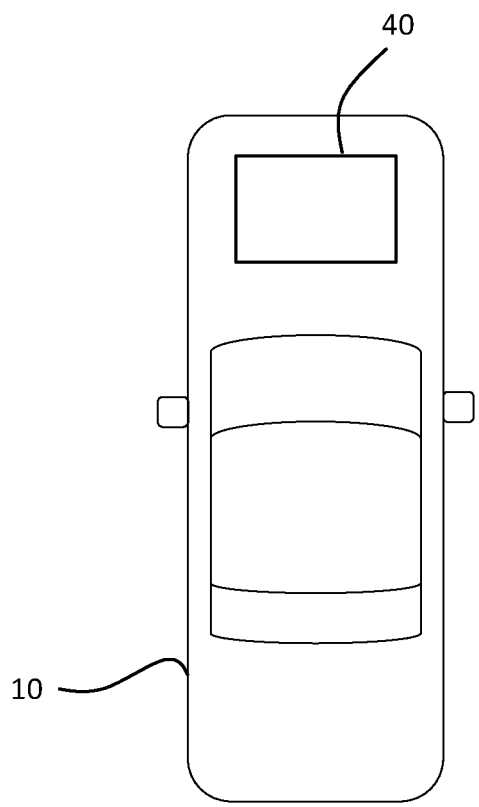
FIG. 1 is a schematic diagram of a vehicle according to an exemplary embodiment.

The following description is merely exemplary in nature and is not intended to limit the present disclosure, its application or uses. It should be understood that throughout the drawings, corresponding reference numerals indicate like or corresponding parts and features.

In radar systems, a CFAR threshold may be selected so as to exclude all points in the detected beam response spectrum below a predetermined value when identifying detection targets as points in the detected beam response that are above the predetermined value. In other words, a CFAR threshold may be a constant value for all angles of arrival. However, applying an angle-invariant threshold such as a CFAR threshold may result in the false identification of side lobes of a beam response as a valid target, or may exclude secondary detected targets if the power of the beam response for the secondary detected targets is below the CFAR threshold.

Accordingly, as an improvement over using an invariant CFAR threshold, it may be desirable to provide a radar system and method that uses a threshold envelope that varies as a function of angle of arrival according to one or more embodiments. This would allow for reduction of false identifications of targets and as well as improvement of detection of secondary targets that sometimes occurs with invariant thresholds such as a CFAR threshold.

In accordance with an exemplary embodiment, FIG. 1 is a block diagram of a vehicle 10 that includes a radar system 40 for detecting objects. The exemplary vehicle 10 shown in FIG. 1 is an automobile, but it should be appreciated that other types of vehicles including motorcycles, trucks, sport utility vehicles (SUVs), recreational vehicles (RVs), automated factory equipment, construction equipment, farm equipment, marine vessels, aircraft, may include the radar system 40.

Figure 2:
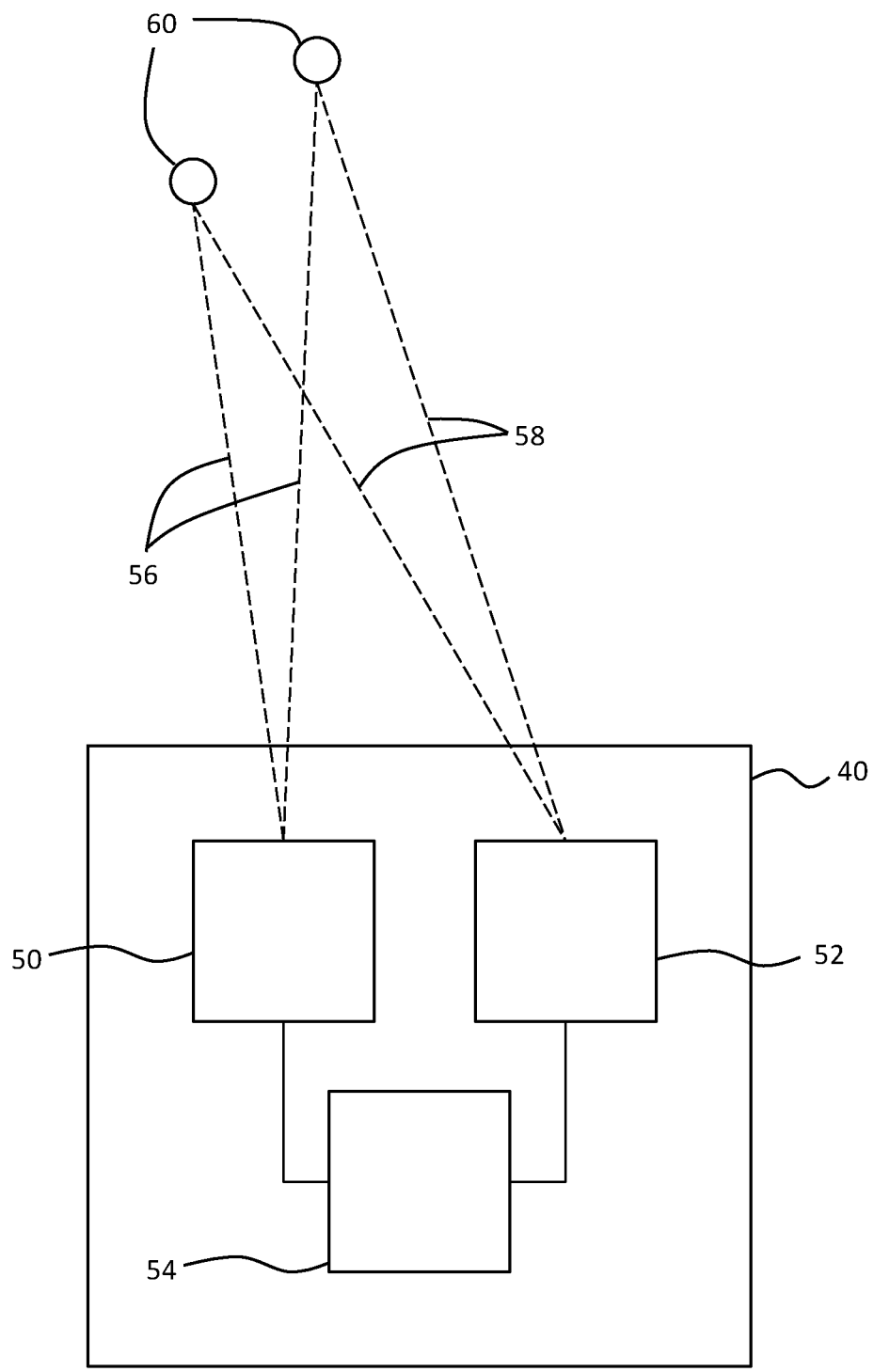
FIG. 2 is a schematic diagram of a radar system according to an exemplary embodiment.

FIG. 2 shows an exemplary embodiment of radar system 40 in schematic form. Radar system 40 may include a transmitter 50, receiver 52, and controller 54. Transmitter 50 may be operably connected to controller 54 and structured to transmit a radar signal 56. Receiver 52 may be operably connected to controller 54 and structured to receive reflected radar signals 58 reflected from one or more detection targets 60. Alternatively, radar system 40 may not have a dedicated controller 54, and instead a controller may be provided separately in vehicle 10 and operably connected to radar system 40. The vehicle controller or controller 54 includes processing circuitry that may include an application specific integrated circuit (ASIC), an electronic circuit, a controller (shared, dedicated, or group) and memory that executes one or more software or firmware programs, a combinational logic circuit, and/or other suitable components that provide the described functionality.

Figure 3:
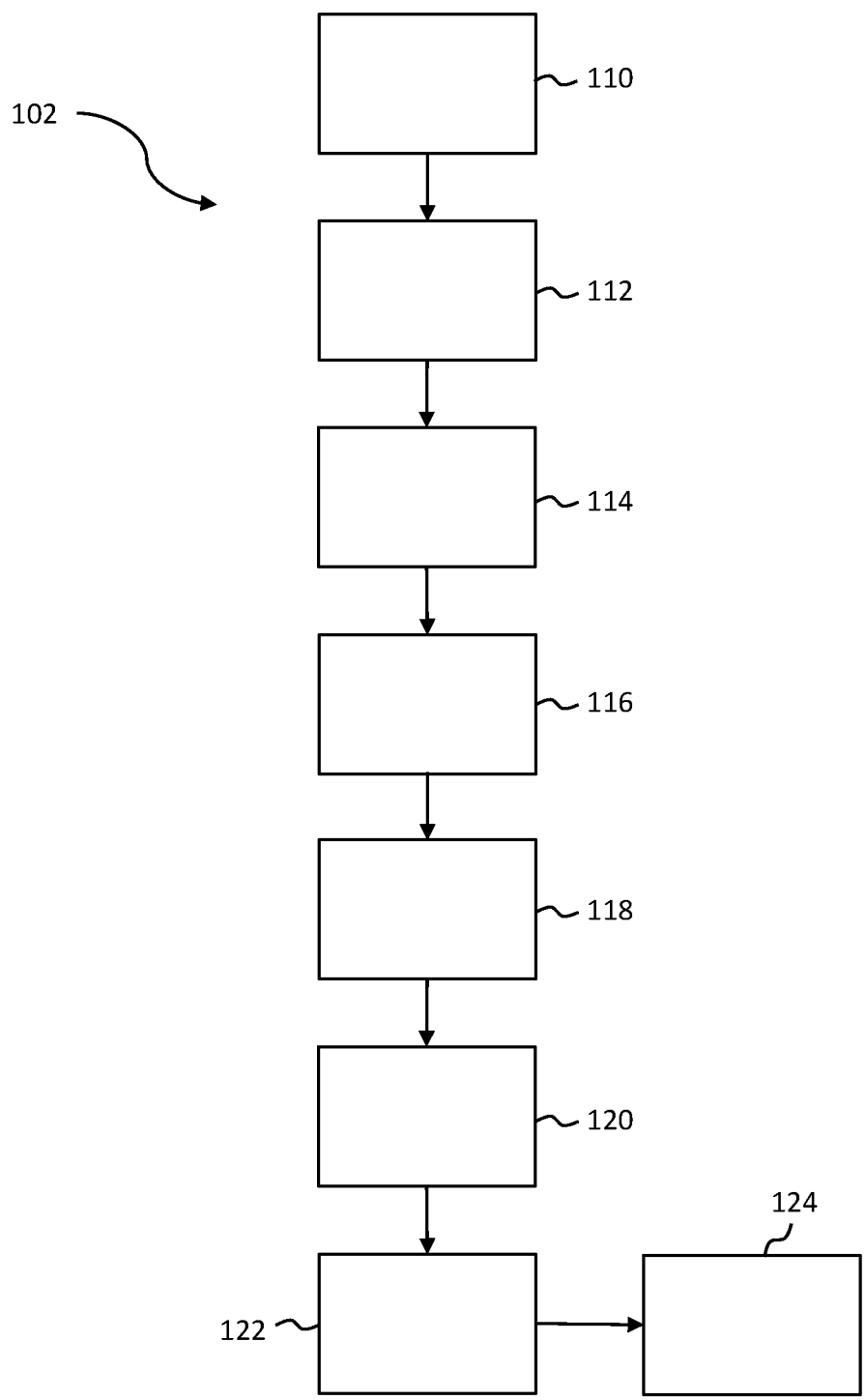
FIG. 3 is a flowchart illustrating an exemplary embodiment of a method for identifying targets in a beam response of a radar system.
Figure 4:
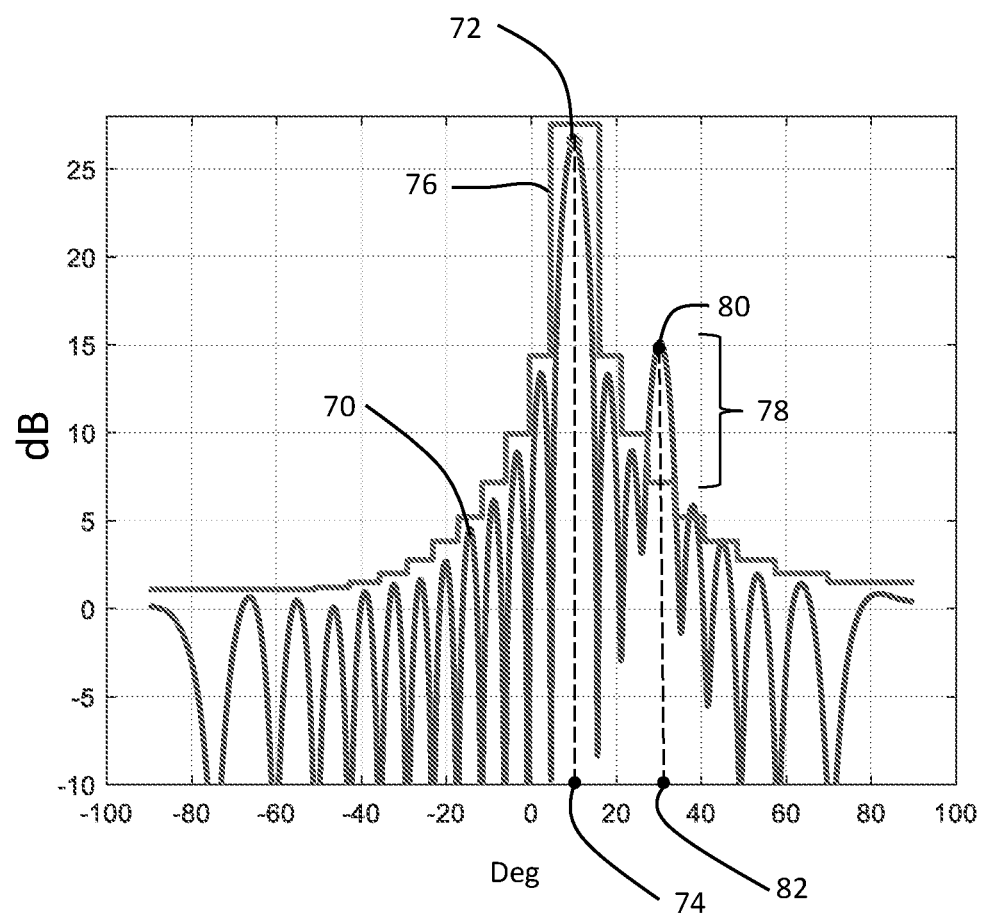
FIG. 4 is a graph illustrating an exemplary embodiment of a threshold envelope.

FIG. 3 shows an exemplary embodiment of a method 102 for identifying targets in a beam response of radar system 40 (see FIG. 2). In block 110, controller 54 may calculate a received beam response spectrum based on reflected radar signals 58 received by receiver 52 (see FIG. 2). FIG. 4 shows an exemplary embodiment of a received beam response spectrum 70 (see FIG. 4). Received beam response spectrum 70 includes a set of power values as a function of angle of arrival.

Returning to FIG. 3, in block 112, controller 54 (see FIG. 2) may detect a first maximum value 72 (see FIG. 4) of the received beam response spectrum 70, which is the maximum value of received beam response spectrum 70. In block 114, controller 54 may further identify an angle corresponding to the first maximum value 72 as a first target angle 74 (see FIG. 4).

In block 116 of FIG. 3, controller 54 (see FIG. 2) may obtain a threshold envelope 76 (see FIG. 4) that is based on the first maximum value 72 and first target angle 74. Calculation of threshold envelope 76 will be discussed in further detail herein. The threshold envelope 76 varies as a function of the detection angle, instead of being constant for all angles of arrival.

In block 118 of FIG. 3, controller 54 (see FIG. 2) may identify a portion 78 (see FIG. 4) of received beam response spectrum 70 that is greater than threshold envelope 76. In block 120, controller 54 may detect a second maximum value 80 in portion 78. In block 122, controller 54 may identify an angle corresponding to the second maximum value 80 as a second target angle 82 (see FIG. 4).

In block 124, controller 54 may output first target angle 74 as an angle of arrival of a reflected radar signal from a first detection target and output second target angle 82 as an angle of arrival of a reflected radar signal from a second detection target.

Figure 3A:
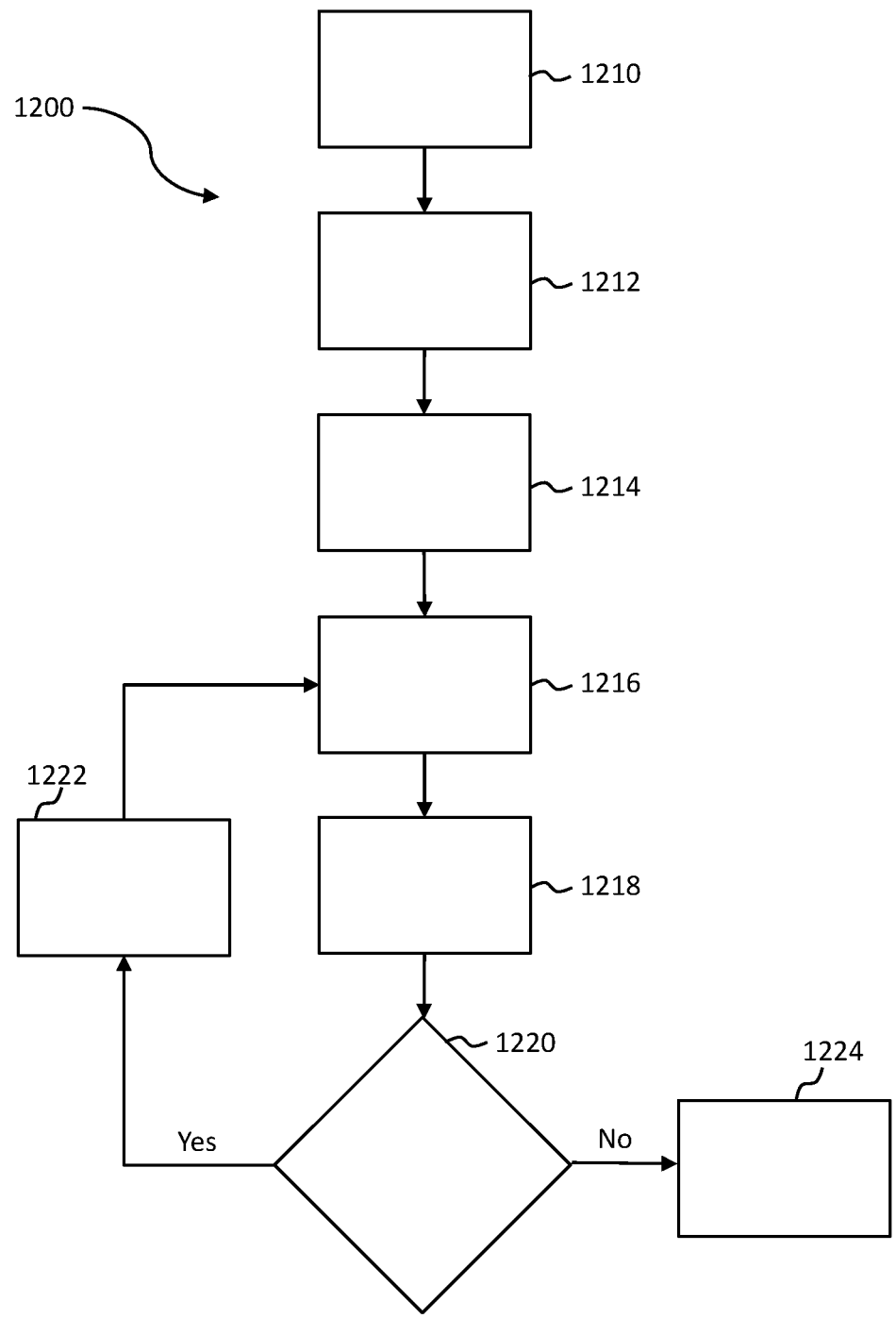
FIG. 3A is a flowchart illustrating an exemplary embodiment of a method for identifying targets in a beam response of a radar system.

It will be understood that method 102 shown in FIG. 3 may be performed recursively to further identify a third or more detection targets. FIG. 3A shows an exemplary embodiment of a recursive method 1200 for identifying targets in a beam response of radar system 40 (see FIG. 2). In block 1210, a received beam response spectrum may be calculated as described herein. In block 1212, controller 54 (see FIG. 2) may generate a cumulative threshold envelope, which may be initially set to 0 for all angles. In block 1214, a maximum value of the received beam response spectrum and an angle corresponding to the maximum value may be detected as described herein. In block 1216, an interim threshold envelope may be obtained based on the maximum value and the angle corresponding to the maximum value. In block 1218, the cumulative threshold envelope may be updated by, for each angle, setting a value of the cumulative threshold envelope equal to the greater of the value of the cumulative threshold envelope and the interim threshold envelope.

In block 1220, it is determined whether there is a portion of received beam response spectrum greater than the cumulative threshold envelope. If there is a portion greater than the cumulative threshold envelope ("yes" in block 1220), then the method proceeds to block 1222. A "yes" result in block 1220 corresponds to a situation where there are still additional targets to detect in the beam response spectrum. If there is no portion greater than the cumulative threshold envelope ("no" in block 1224), then the method proceeds to block 1224. A "no" result in block 1220 corresponds to a situation where there are no further targets to detect in the beam response spectrum.

In block 1222, a new maximum value and angle corresponding to the maximum value are detected from the portion of received beam response spectrum greater than the cumulative threshold envelope. The method then returns to block 1216 in which the new maximum value and angle corresponding to the maximum value are used to obtain a new interim threshold envelope. In block 1224, the method ends and all of the detected maximum values and their corresponding angles are reported as angles of arrival of detection targets.

Figure 5:
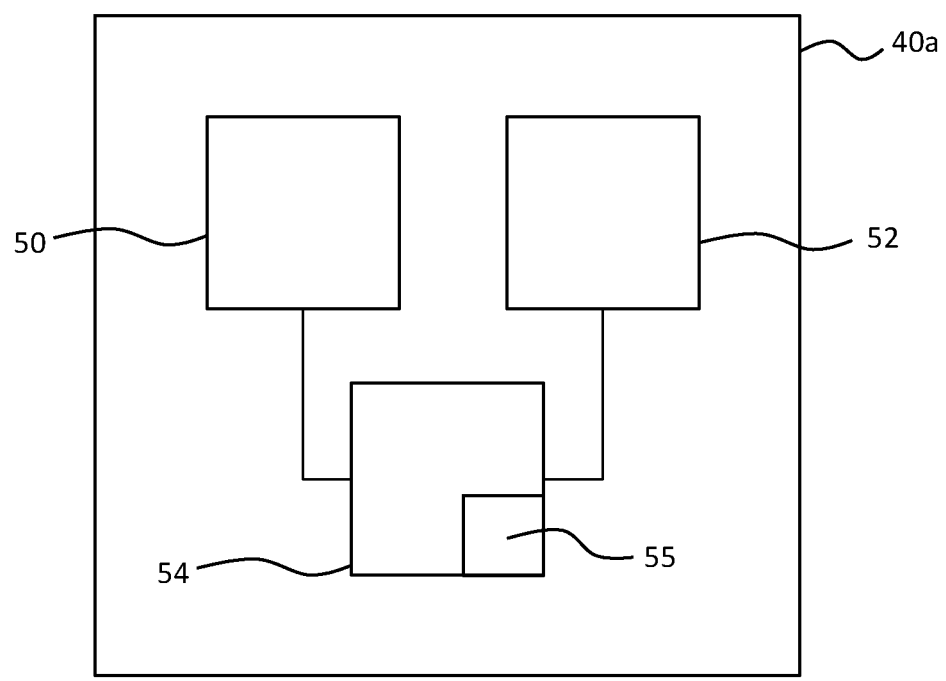
FIG. 5 is a schematic diagram of a radar system according to an exemplary embodiment.
Figure 6:
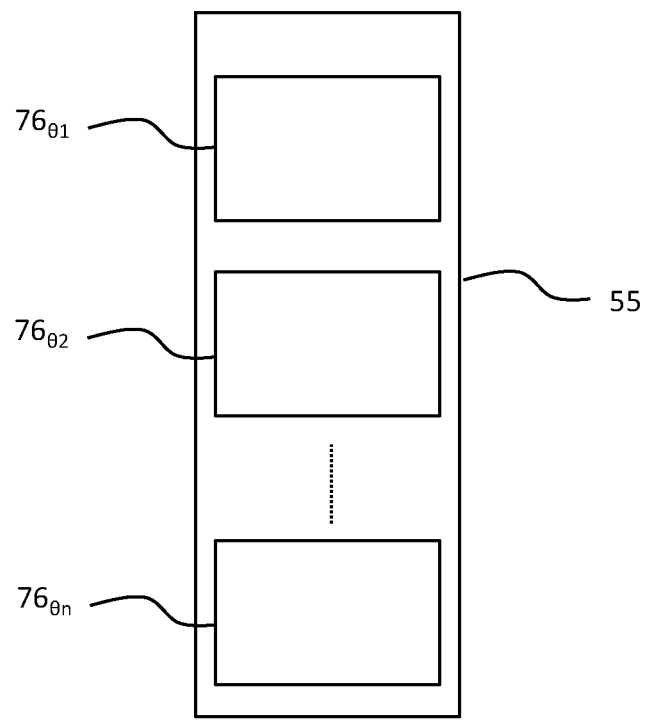
FIG. 6 is a schematic diagram of a storage device according to an exemplary embodiment.

FIG. 5 shows another exemplary embodiment of radar system 40. In FIG. 5, controller 54 is shown with storage device 55. FIG. 6 further details the storage device 55. As seen in FIG. 6, storage device 55 may store a plurality of stored threshold envelopes $76_{\theta 1}, 76_{\theta 2}, \ldots 76_{\theta n}$. Each of the plurality of stored threshold envelopes $76_{\theta 1}, 76_{\theta 2}, \ldots 76_{\theta n}$ may be associated with a different angle of arrival.

Figure 7:
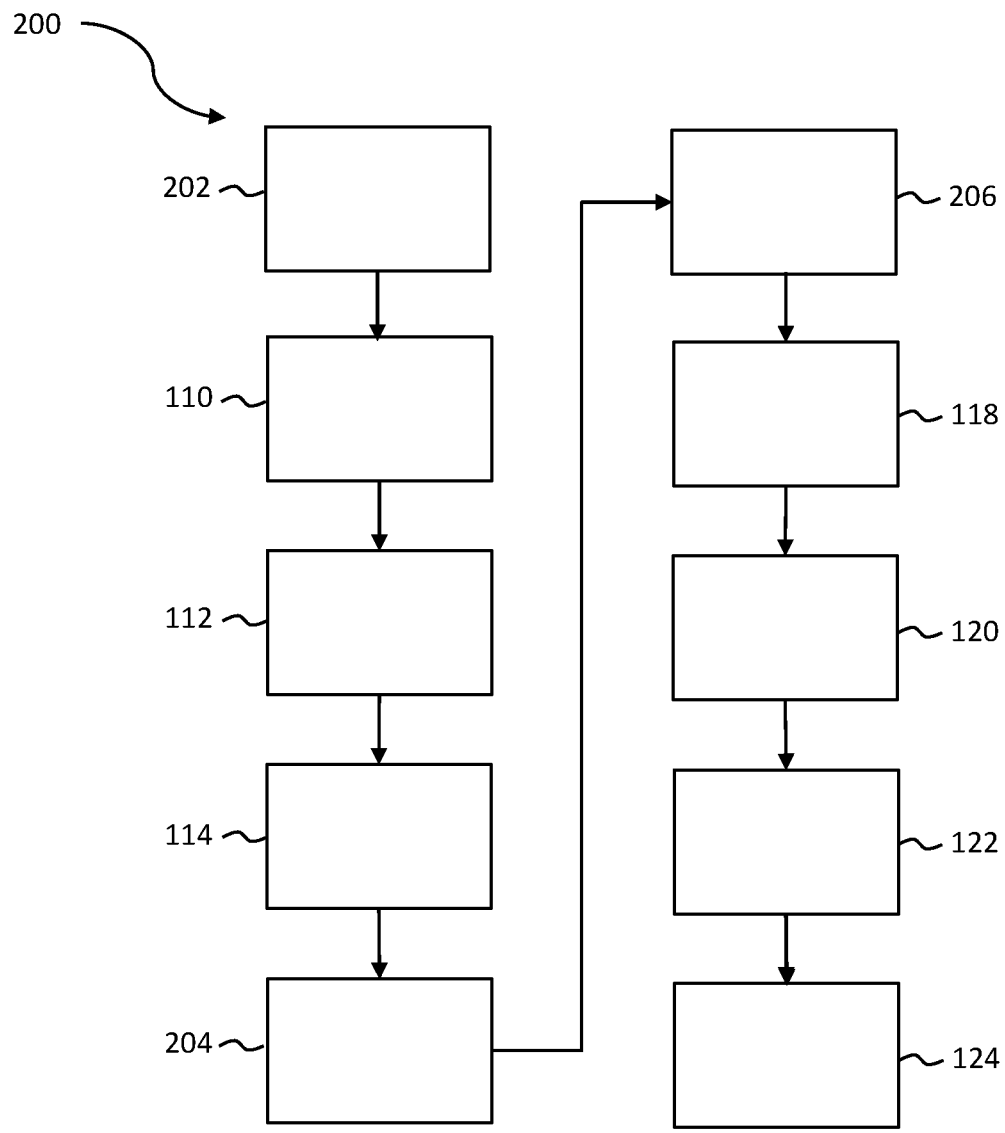
FIG. 7 is a flowchart illustrating an exemplary embodiment of method for identifying targets in a beam response of a radar system.

FIG. 7 shows an exemplary embodiment of a method 200 identifying targets in a beam response of radar system 40 using stored threshold envelopes. Blocks 110, 112, 114, 118, 120, 122, and 124 of FIG. 7 are the same as described herein with respect to FIG. 3.

Returning to FIG. 7, in block 202, the plurality of stored threshold envelopes $76_{\theta 1}, 76_{\theta 2}, \ldots 76_{\theta n}$ may be stored in storage device 55 (see FIG. 6). Alternatively, the plurality of stored threshold envelopes $76_{\theta 1}, 76_{74\ 2}, \ldots 76_{\theta n}$ may be stored in a computer-readable medium.

Similar to the method illustrated in FIG. 3 and described herein, in block 110 of FIG. 7, a received beam response spectrum 70 is calculated. A first maximum value 72 of the received beam response is detected in block 112. In block 114, an angle corresponding to the first maximum value is identified as a first target angle 74.

In block 204, controller 54 (see FIG. 2) may identify a first stored threshold envelope among the plurality of stored threshold envelopes $76_{\theta 1}, 76_{\theta 2}, \ldots 76_{\theta n}$ having an associated angle of arrival corresponding to the first target angle 74 (see FIG. 4). In block 206, controller 54 sets the first stored threshold envelope as the threshold envelope 76 (see FIG. 4) to be used in block 118. As illustrated in FIG. 3 and described herein, in block 118 of FIG. 7, a portion 78 of the received beam response spectrum 70 that is greater than the threshold envelope 76 is identified. In block 120, a second maximum value 80 may be detected in portion 78. In block 122, an angle corresponding to the second maximum value 80 may be identified as a second target angle 82. In block 124, the first target angle 74 may be output as an angle of arrival of a reflected radar signal from a first detection target and output second target angle 82 as an angle of arrival of a reflected radar signal from a second detection target.

Figure 8:
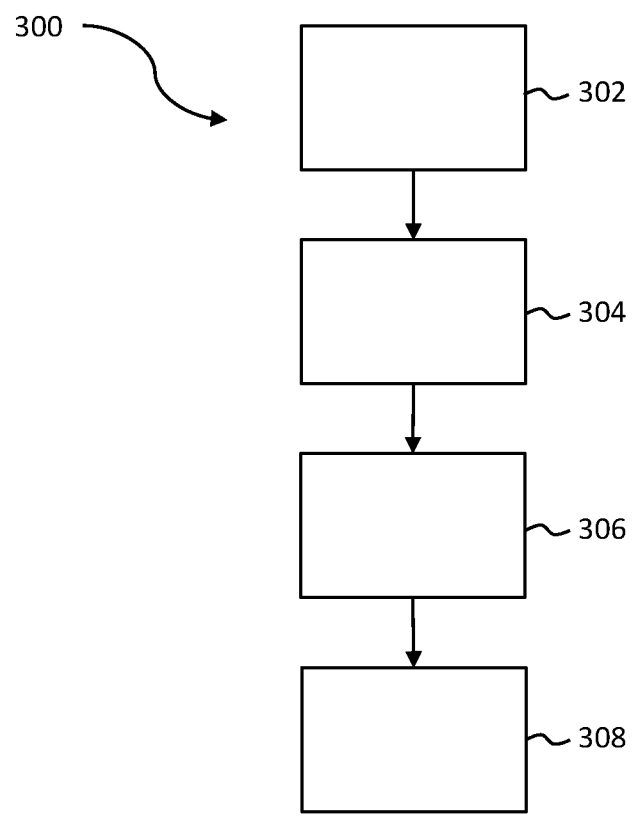
FIG. 8 is a flowchart illustrating an exemplary embodiment of calculating a plurality of stored threshold envelopes.

FIG. 8 shows an exemplary embodiment of a method 300 for calculating the plurality of stored threshold envelopes $76_{\theta 1}, 76_{\theta 2}, \ldots 76_{\theta n}$. In block 302, radar system 40 (see FIG. 2) is calibrated and a calibration matrix is generated. The calibration matrix may be a two-dimensional matrix of P directions (i.e., angles of arrival θ) by Q elements. The calibration matrix includes the data necessary to calculate the beam response based on reflected radar signals 58 detected by radar receiver 52 (see FIG. 2).

In block 304, a confusion matrix is calculated according to the equation:

$$\text{ConfusionMat} = \text{CalibrationMat} \cdot \text{CalibrationMat}^H; \quad (1)$$

where ConfusionMat is the confusion matrix, CalibrationMat is a calibration matrix of the radar system 40 (see FIG. 2), and CalibrationMat$^H$ is a Hermitian transpose of the calibration matrix. In block 306, the plurality of stored threshold envelopes $76_{\theta 1}, 76_{\theta 2}, \ldots 76_{\theta n}$ are calculated based on the confusion matrix. In block 308, the plurality of stored threshold envelopes $76_{\theta 1}, 76_{\theta 2}, \ldots 76_{\theta n}$ are stored in storage device 55 (FIG. 5).

Figure 9:
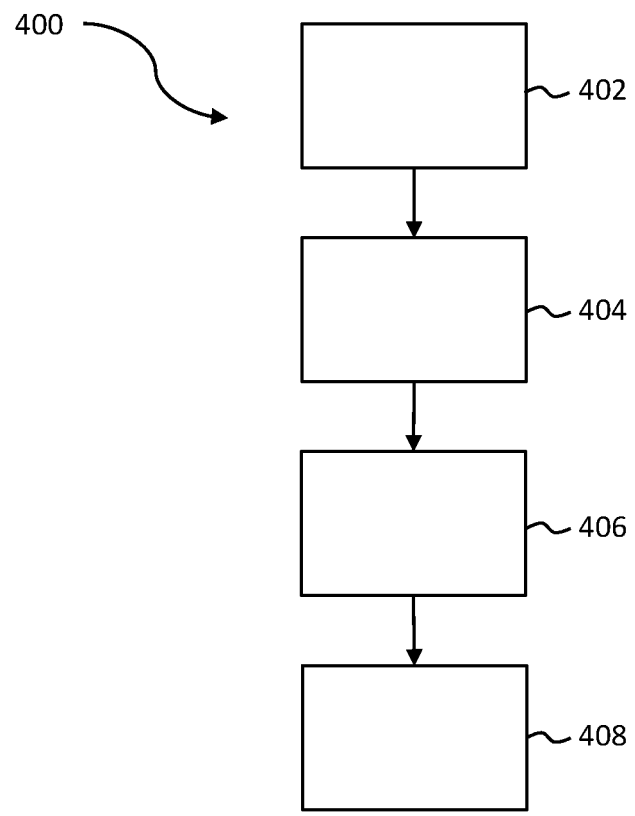
FIG. 9 is a flowchart illustrating an exemplary embodiment of calculating stored threshold envelopes based on a confusion matrix.

FIG. 9 shows an exemplary embodiment of a method 400 for calculating the plurality of stored threshold envelopes $76_{\theta 1}, 76_{\theta 2}, \ldots 76_{\theta n}$ (see FIG. 6) based on the confusion matrix. Method 400 may be performed for each angle of arrival θ included in the calibration matrix. In block 402, an arbitrary beam response Bo is generated according to the following equation:

$$B_\theta = |A_\theta|^2; \quad (2)$$

where $A_\theta$=ConfusionMat[θ,:]. The notation [θ,:] indicates all values of the confusion matrix corresponding to angle of arrival θ. In block 404, a monotonous transformation is performed on arbitrary beam response $B_\theta$. Calculation of the monotonous transformation is described in detail herein. In block 406, envelope widening is performed on the monotonous transformation calculated in block 404. Calculation of the envelope widening is described in detail herein. In block 408, a bias is added to the calculated envelope to account for noise. It will be understood that by adding the bias in block 408, the calculated envelope will have a value greater than a value of the arbitrary beam response at all angles.

The following Table 1 shows an exemplary embodiment of an algorithm for performing a monotonous transformation on arbitrary beam response Bo (Algorithm 1) and an exemplary algorithm for performing envelope widening on the result of the monotonous transformation (Algorithm 2).

TABLE 1

Algorithm 1 Monotonous Transformation

```
Require: B,I = len(B)
  E = B
  M = max(B)
  for i = 1 : M − 1 do                    ▹ Left Side
    if E[i + 1] < E[i] then
      E[i + 1] = E[i]
    end if
  end for
  for i = I : −1 : M + 1 do               ▹ Right Side
    if E[i + 1] > E[i] then
      E[i] = E[i + 1]
    end if
  end for
  return E
```

Algorithm 2 Envelope Widening

```
Require: E,I = len(E),N
  for i = N : M − 1 do                    ▹ Left Side
    if E[i + 1] == E[i] then
      E[i − N + 1 : i] = E[i + 1]
    end if
  end for
  for i = I − N : −1 : M + 1 do           ▹ Right Side
    if E[i + 1] == E[i] then
      E[i + N : −1 : i] = E[i + 1]
    end if
  end for
  E(M − 2N :M+ 2N) = E(M)                 ▹ Main Lobe
  return E
```

In Algorithm 1 in Table 1, left side monotonous transformation is first performed by setting index i equal to 1. Next, it is determined whether $E_{i+1}$ is less than $E_i$. The notation $E_x$ indicates a value of array E at index x. If $E_{i+1}$ is less than then Algorithm 1 sets $E_{i+1}$ equal to E. If $E_{i-1}$ is not less than $E_i$, then $E_{i+1}$ is left unchanged. Next, it is determined whether index i is equal to M−1. If i is equal to M−1, then the left side monotonous transformation ends and Algorithm 1 proceeds to the right side monotonous transformation described herein. If i is not equal to M−1, Algorithm 1 increments index i by 1 and loops back.

In the right side monotonous transformation, Algorithm 1 sets index i is equal to 1, which is a length of array E. Next, it is determined whether $E_{i+1}$ is greater than $E_i$. If $E_{i+1}$ is greater than $E_i$ then Algorithm 1 sets $E_i$ equal to $E_{i+1}$. If $E_{i+1}$ is not greater than then $E_i$, remains unchanged. Next, it is determined whether index i is equal to M+1. If i is equal to M+1, then the right side monotonous transformation ends. If i is not equal to M+1, then Algorithm 1 decrements index i by 1 and loops back.

In Algorithm 2 of Table 1, a value N is determined, which is a distance between nulls in the arbitrary beam pattern Bo. Algorithm 2 performs left side envelope widening by first setting index i equal to N. Next, it is determined whether $E_{i+1}$ is equal to $E_i$. If $E_{i+1}$ is equal to then Algorithm 2 sets all elements of array E from $E_{i-N+1}$ to $E_i$ equal to $E_{i+1}$. If $E_{i+1}$ is not equal to then no change is made. Next, it is determined whether index i is equal to M−1. If i is equal to M−1, left side envelope widening ends and Algorithm 2 proceeds to right side envelope widening. If i is not equal to M−1, Algorithm 2 increments index i by 1 and loops back.

In the right side envelope widening, Algorithm 2 first sets index i to be equal to I−N. Next, it is determined whether $E_{i+1}$ is equal to $E_i$. If $E_{i+1}$ is equal to $E_i$, Algorithm 2 sets all elements of array E from $E_{i+N}$ to $E_i$ to be equal to $E_{i+1}$. If $E_{i+1}$ is not equal to $E_i$ then no change is made. Next, it is determined whether index i is equal to M+1. If i is equal to M+1 then the right side envelope widening ends. If is not equal to M+1, then Algorithm 2 decrements index i by 1 and the method loops back. For the main lobe of array E, Algorithm 2 performs envelope widening by setting values for $E_{M-2N}$ through $E_{M+2N}$ equal to $E_M$.

FIG. 4 shows an exemplary embodiment of a threshold envelope 76 calculated from the methods described with reference to FIGS. 8-10. In FIG. 4, the horizontal axis indicates an angle of arrival in degrees (Deg) and the vertical axis shows a power in decibels (dB). FIG. 4 shows that threshold envelope 76 is monotonically increasing for angles less than the first target angle 74, and monotonically decreasing for angles greater than the first target angle 74.

Figure 10:
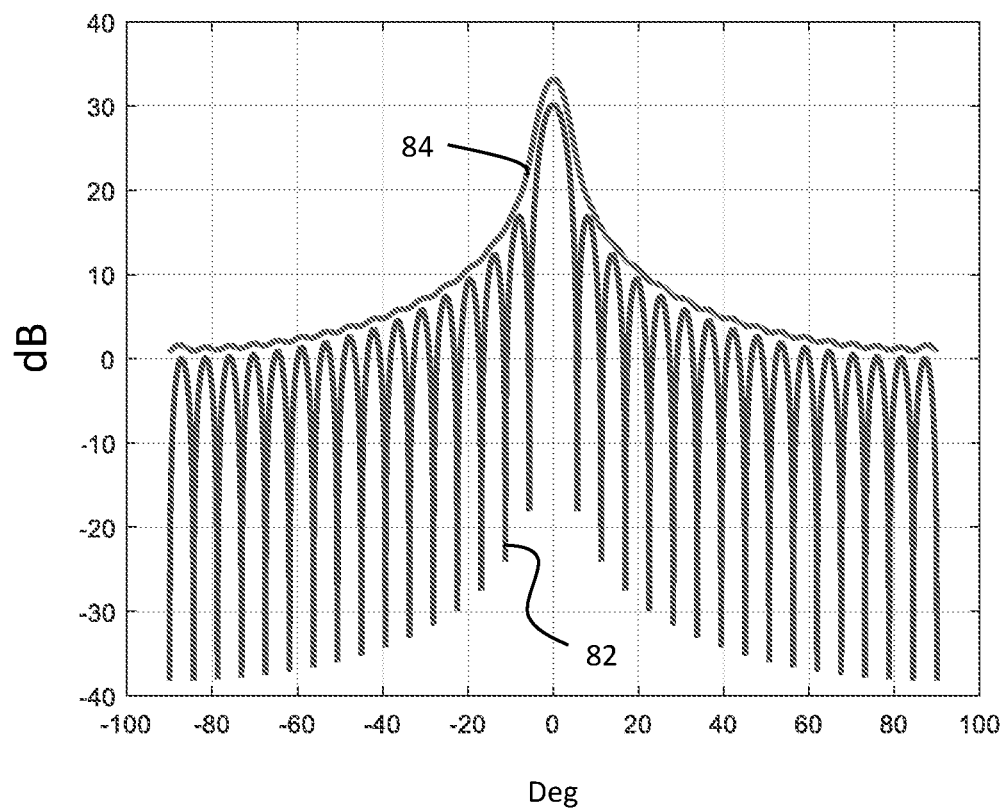
FIG. 10 is a graph illustrating an exemplary embodiment of a threshold envelope calculated using a smooth operation.

FIG. 10 shows an exemplary embodiment of a threshold envelope 84 based on arbitrary beam response 82. In FIG. 10, threshold envelope 84 is calculated by performing smoothing with a Gaussian window over the arbitrary beam response 82 and adding a bias value to account for noise. Threshold envelope 84 is calculated for an arbitrary beam response 82 at angle θ=0, but it will be understood that similar threshold envelopes could be calculated using smoothing with a Gaussian window at other angles θ. In this way, the plurality of stored threshold envelopes $76_{\theta 1}$, $76_{\theta 2}$, . . . $76_{\theta n}$ (see FIG. 6) may be calculated using smoothing with a Gaussian window instead of using the methods described in with reference to FIGS. 8-15.

Figure 11:
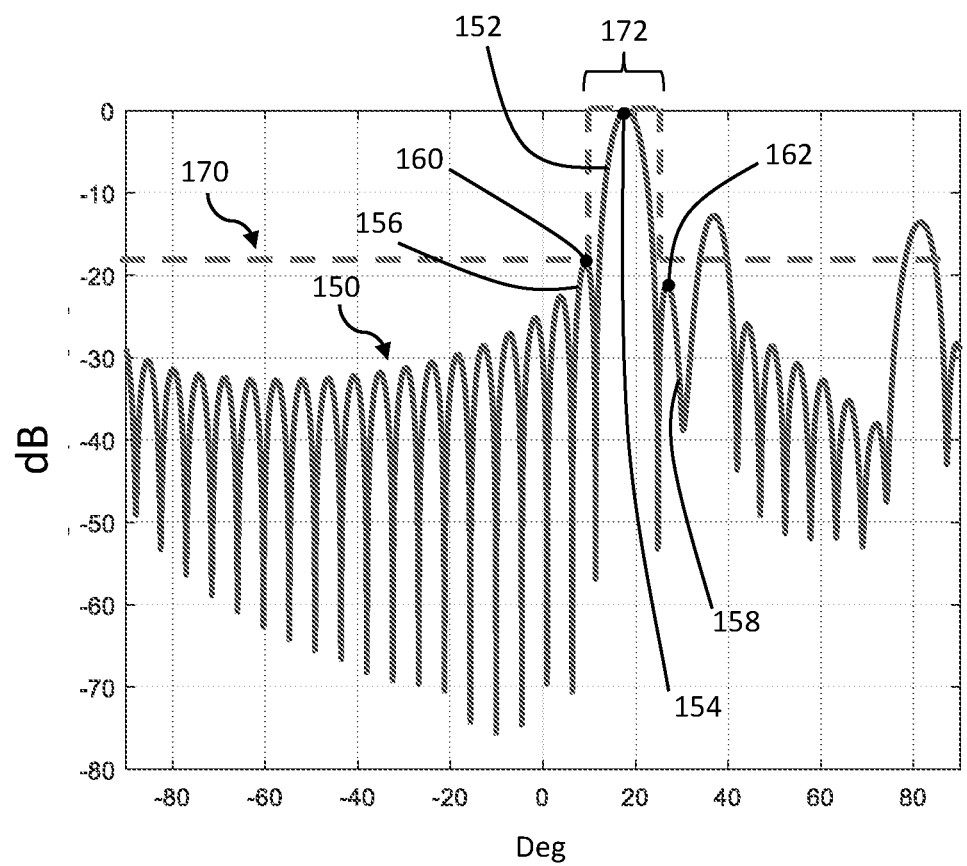
FIG. 11 is a graph illustrating an exemplary embodiment of a simplified threshold envelope.

FIG. 11 shows an exemplary embodiment of calculating a simplified threshold envelope 170 in real time based on received beam response 150. Simplified threshold envelope 170 may be used instead of previously storing the plurality of stored threshold envelopes $76_{\theta 1}$, $76_{\theta 2}$, . . . $76_{\theta n}$ (see FIG. 6). FIG. 11 shows a received beam response 150 is obtained by controller 54 (see FIG. 2). Received beam response 150 may include target main lobe 152 that includes maximum value 154. The received beam response 150 may further include adjacent sidelobes 156, 158 immediately adjacent to target main lobe 152. Adjacent sidelobe 156 has a first sidelobe peak 160 and adjacent sidelobe 158 has a second sidelobe peak 162. Simplified threshold envelope 170 may be a function having a value equal to maximum value 154 for angles corresponding to a width of the target main lobe indicated by region 172 in FIG. 11. For all other angles, simplified threshold envelope has a value equal to the higher of first sidelobe peak 160 and second sidelobe peak 162.

Determining the simplified threshold envelope 170 requires less processing resources than determining threshold envelope 76 or threshold envelope 84. For example if the plurality of stored threshold envelopes $76_{\theta 1}, 76_{\theta 2}, \ldots 76_{\theta n}$ (see FIG. 6) are used, the process of retrieving a stored threshold envelope from storage device 55 requires significant processing resources to retrieve the large amount of values included in a stored threshold envelope. In contrast, simplified threshold envelope 170 can be quickly calculated in real time using minimal processing resources.

The exemplary embodiments described above result in significant advantages. For example, the exemplary embodiments use an angle dependent threshold to make it possible to detect multiple targets within a beam response that may otherwise be missed if an invariant CFAR threshold was applied to the beam response. Additionally, the exemplary embodiments help to prevent false identification of side lobes as detection targets. This allows a radar system to provide more accurate information regarding angles of arrival of detection targets, thereby resulting in a more accurate radar system.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system comprising:
 a transmitter structured to transmit a radar signal;
 a receiver structured to receive a reflected radar signal; and
 a controller configured to identify an angle of arrival of a reflected radar signal from a first target and an angle of arrival of a reflected radar signal from a second target by performing:
 calculating a received beam response spectrum based on the received reflected radar signal, the received beam response spectrum comprising a set of power values as a function of angle of arrival;
 detecting a first maximum value of the received beam response spectrum;
 identifying an angle corresponding to the first maximum value as a first target angle;
 obtaining a threshold envelope based on the first maximum value and the first target angle;
 detecting a second maximum value in a portion of the received beam response spectrum being greater than the threshold envelope;
 identifying an angle corresponding to the second maximum value as a second target angle; and
 outputting the first target angle as the angle of arrival of the reflected radar signal from the first target and the second target angle as the angle of arrival of the reflected radar signal from the second target.

2. The radar system of claim 1, wherein the received beam response spectrum comprises a target main lobe including the first maximum value;
 the threshold envelope is a function having a value equal to the first maximum value for angles corresponding to a width of the target main lobe, and, for all other angles, having a value equal to a highest sidelobe peak level among sidelobes immediately adjacent to the target main lobe in the received beam response spectrum.

3. The radar system of claim 1, further comprising:
 a storage device storing a plurality of stored threshold envelopes, each stored threshold envelope of the plurality of stored threshold envelopes being associated with a different angle of arrival;
 wherein controller is configured such that the obtaining a threshold envelope based on the first maximum value and the first target angle comprises:
 identifying a first stored threshold envelope among the plurality of stored threshold envelopes having an associated angle of arrival corresponding to the first target angle;
 setting the first stored threshold envelope as the threshold envelope.

4. The radar system of claim 1, wherein the controller is further configured to generate a cumulative threshold envelope initially equal to the threshold envelope; and
 wherein the controller is further configured to recursively perform the following until no subsequent maximum values are detected:
 obtaining an additional threshold envelope based on an additional maximum value and an additional target angle;
 modifying the cumulative threshold envelope based on the additional threshold envelope; and
 detecting a subsequent maximum value in a portion of the received beam response spectrum being greater than the cumulative threshold envelope;
 wherein the second maximum value is used as an initial value of the additional maximum value and the second target angle is used as an initial value of the additional target area;
 identifying an angle corresponding to the second maximum value as a second target angle.

5. The radar system of claim 1, wherein the threshold envelope is calculated based on an arbitrary beam response of the radar system at the first target angle and is a function that, for all angles, has a value greater than a value of the arbitrary beam response.

6. The radar system of claim 1, wherein the threshold envelope is calculated based on an arbitrary beam response of the radar system at the first target angle and is calculated by performing smoothing with a Gaussian window over the arbitrary beam response and adding a bias value.

7. The radar system of claim 1, wherein the threshold envelope is calculated based on an arbitrary beam response of the radar system at the first target angle, the arbitrary beam response comprising a plurality of lobes, each lobe comprising a maximum value and a width; and
 wherein the threshold envelope is a function such that, for each lobe of the arbitrary beam response, the threshold envelope has a value equal to the maximum value of the lobe plus a bias value for all angles corresponding to the width of the lobe.

8. The radar system of claim 1, wherein the threshold envelope monotonically increases for angles less than the first target angle and monotonically decreases for angles greater than the first target angle.

9. The radar system of claim 1, further comprising:
 a storage device storing a plurality of stored threshold envelopes, each stored threshold envelope of the plurality of stored threshold envelopes being associated with a different angle of arrival, based on a confusion matrix given by the following equation:

ConfusionMat=CalibrationMat·CalibrationMat$^H$;

wherein ConfusionMat is the confusion matrix, CalibrationMat is a calibration matrix of the radar system, and CalibrationMat$^H$ is a Hermitian transpose of the calibration matrix;

wherein the plurality of stored threshold envelopes comprises, for each angle of arrival θ, a stored threshold envelope calculated by:

generating an arbitrary beam response $B_θ$ given by the equation $B_θ=|A_θ|^2$, where $A_θ$=ConfusionMat[θ,:];

generating an array E equal to the arbitrary beam response $B_θ$;

identifying an index M of a maximum value of the arbitrary beam response $B_θ$;

for each element of array E from $E_1$ to $E_{M-1}$, setting $E_{i+1}$ equal to $E_i$ if $E_{i+1}$ is less than $E_i$, i being an index of array E;

for each element of array E from $E_I$ to $E_{M+1}$, I being a length of array E, setting $E_i$ equal to $E_{i+1}$ if $E_{i+1}$ is greater than $E_i$;

for each element of array E from $E_N$ to $E_{M-1}$, N being a distance between nulls in the arbitrary beam response $B_θ$, setting elements of array E from $E_{i-N+1}$ to $E_i$ equal to $E_{i+1}$ if $E_{i+1}$ is equal to $E_i$;

for each element of array E from $E_{I-N}$ to $E_{M+1}$, setting elements of array E from $E_{i+N}$ to $E_i$ equal to $E_{i+1}$ if $E_{i+1}$ is equal to $E_i$;

setting element of array E from $E_{M-2N}$ to $E_{M+2N}$ equal to $E_M$;

adding a bias value to each element of array E, setting array E as the stored threshold envelope for angle θ;

wherein the controller is configured such that the obtaining a threshold envelope based on the first maximum value and the first target angle comprises:

identifying a first stored threshold envelope among the plurality of stored threshold envelopes having an associated angle of arrival corresponding to the first target angle;

setting the first stored threshold envelope as the threshold envelope.

10. A method for identifying targets in a beam response of a radar system, the method comprising:
receiving a reflected radar signal with a radar receiver;
calculating a received beam response spectrum based on the received reflected radar signal, the received beam response spectrum comprising a set of power values as a function of angle of arrival;
detecting a first maximum value of the received beam response spectrum;
identifying an angle corresponding to the first maximum value as a first target angle;
obtaining a threshold envelope based on the first maximum value and the first target angle;
detecting a second maximum value in a portion of the received beam response spectrum being greater than the threshold envelope;
identifying an angle corresponding to the second maximum value as a second target angle; and
outputting the first target angle as an angle of arrival of the reflected radar signal from a first target and the second target angle as an angle of arrival of the reflected radar signal from a second target.

11. The method of claim 10, wherein the received beam response spectrum comprises a target main lobe including the first maximum value;
the threshold envelope is a function having a value equal to the first maximum value for angles corresponding to a width of the target main lobe, and, for all other angles, having a value equal to a highest sidelobe peak level among sidelobes immediately adjacent to the target main lobe in the received beam response spectrum.

12. The method of claim 10, further comprising:
previously storing a plurality of stored threshold envelopes, each stored threshold envelope of the plurality of stored threshold envelopes being associated with a different angle of arrival;
wherein the obtaining a threshold envelope based on the first maximum value and the first target angle comprises:
identifying a first stored threshold envelope among the plurality of stored threshold envelopes having an associated angle of arrival corresponding to the first target angle;
setting the first stored threshold envelope as the threshold envelope.

13. The method of claim 10, further comprising:
generating a cumulative threshold envelope initially equal to the threshold envelope; and
recursively performing the following until no subsequent maximum values are detected:
obtaining an additional threshold envelope based on an additional maximum value and an additional target angle;
modifying the cumulative threshold envelope based on the additional threshold envelope; and
detecting a subsequent maximum value in a portion of the received beam response spectrum being greater than the cumulative threshold envelope;
wherein the second maximum value is used as an initial value of the additional maximum value and the second target angle is used as an initial value of the additional target area.

14. The method of claim 10, wherein the threshold envelope is calculated based on an arbitrary beam response of the radar system at the first target angle and is a function that, for all angles, has a value greater than a value of the arbitrary beam response.

15. The method of claim 10, wherein the threshold envelope is calculated based on an arbitrary beam response of the radar system at the first target angle and is calculated by performing smoothing with a Gaussian window over the arbitrary beam response and adding a bias value.

16. The method of claim 10, wherein the threshold envelope is calculated based on an arbitrary beam response of the radar system at the first target angle, the arbitrary beam response comprising a plurality of lobes, each lobe comprising a maximum value and a width; and
wherein the threshold envelope is a function such that, for each lobe of the arbitrary beam response, the threshold envelope has a value equal to the maximum value of the lobe plus a bias value for all angles corresponding to the width of the lobe.

17. The method of claim 10, wherein the threshold envelope monotonically increases for angles less than the first target angle and monotonically decreases for angles greater than the first target angle.

18. The method of claim 10, further comprising:
calibrating the radar system to generate a calibration matrix;
calculating a confusion matrix based on the calibration matrix according to the following equation:

$$\text{ConfusionMat} = \text{CalibrationMat} \cdot \text{CalibrationMat}^H;$$

wherein ConfusionMat is the confusion matrix, CalibrationMat is the calibration matrix, and CalibrationMat$^H$ is a Hermitian transpose of the calibration matrix;
calculating a plurality of stored threshold envelopes based on the confusion matrix, each stored threshold envelope of the plurality of stored threshold envelopes being associated with a different angle of arrival;
wherein the calculating a plurality of stored threshold envelopes comprises, for each angle of arrival θ, calculating a stored threshold envelope, wherein the calculating the stored threshold envelope comprises:
generating an arbitrary beam response $B_\theta$ given by the equation $B_\theta = |A_\theta|^2$, where $A_\theta = \text{ConfusionMat}[\theta, :]$;
generating an array E equal to the arbitrary beam response $B_\theta$;
identifying an index M of a maximum value of the arbitrary beam response $B_\theta$;
for each element of array E from $E_1$ to $E_{M-1}$, setting $E_{i+1}$ equal to $E_i$ if $E_{i+1}$ is less than $E_i$, i being an index of array E;
for each element of array E from $E_I$ to $E_{M+1}$, I being a length of array E, setting $E_i$ equal to $E_{i+1}$ if $E_{i+1}$ is greater than $E_i$;
for each element of array E from $E_N$ to $E_{M-1}$, N being a distance between nulls in the arbitrary beam response $B_\theta$, setting elements of array E from $E_{i-N+1}$ to $E_i$ equal to $E_{i+1}$ if $E_{i+1}$ is equal to $E_i$;
for each element of array E from $E_{I-N}$ to $E_{M+1}$, setting elements of array E from $E_{i+N}$ to $E_i$ equal to $E_{i+1}$ if $E_{i+1}$ is equal to $E_i$;
setting element of array E from $E_{M-2N}$ to $E_{M+2N}$ equal to $E_M$;
adding a bias value to each element of array E,
setting the stored threshold envelope to array E;
wherein the obtaining a threshold envelope based on the first maximum value and the first target angle comprises:
identifying a first stored threshold envelope among the plurality of stored threshold envelopes having an associated angle of arrival corresponding to the first target angle;
setting the first stored threshold envelope as the threshold envelope.

\* \* \* \* \*